Figure 1:
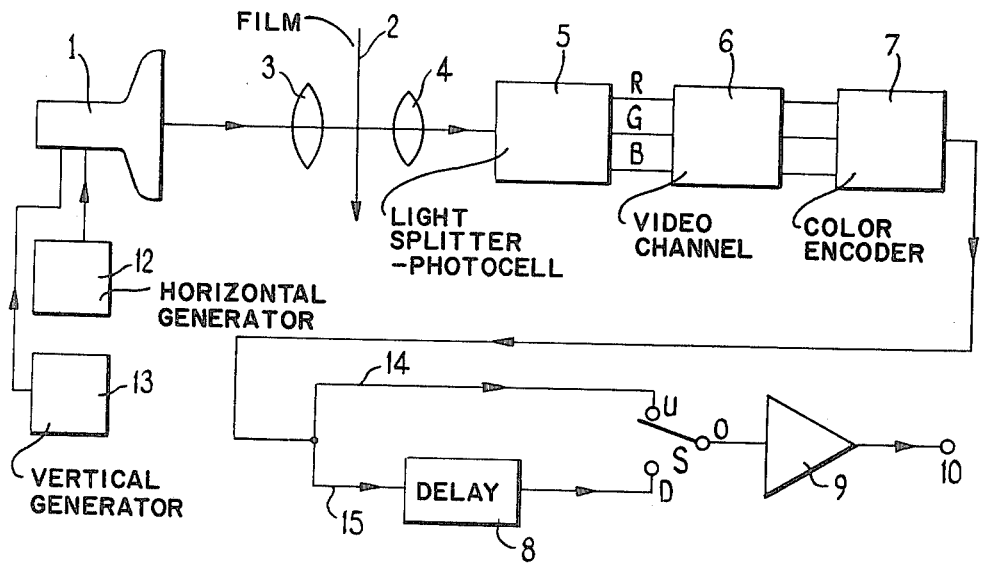

United States Patent [19]
Matchell

[11] 4,191,972
[45] Mar. 4, 1980

[54] FLYING SPOT SINGLE FIELD SCAN TELECINE APPARATUS

[75] Inventor: Raymond Matchell, Ware, England

[73] Assignee: The Rank Organisation Limited, London, England

[21] Appl. No.: 865,773

[22] Filed: Dec. 30, 1977

[30] Foreign Application Priority Data

Jan. 27, 1977 [GB] United Kingdom ............... 3336/77

[51] Int. Cl.² .............................................. H04N 3/36
[52] U.S. Cl. .................................................. 358/214
[58] Field of Search ............................... 358/214–216, 358/130–132, 54

[56] References Cited
FOREIGN PATENT DOCUMENTS 821163  9/1959  United Kingdom ..................... 358/214

Primary Examiner—John C. Martin
Attorney, Agent, or Firm—Brisebois & Kruger

[57] ABSTRACT

In order to avoid the registration problems involved in multiple scanning of each film frame in a continuous motion flying spot telecine, the video information derived from one field scan only of each frame is used to build up the complete television signal by storage and delay of the video information to fill in the missing fields.

The loss of vertical resolution thus produced can be compensated if desired by the use of a known vertical aperture corrector. Preferably, however, a high frequency spot wobble is added to the scanning raster and consecutive television fields are derived alternately from the positive and negative half cycles of the spot wobble.

10 Claims, 7 Drawing Figures

FLYING SPOT SINGLE FIELD SCAN TELECINE APPARATUS

This invention relates to a flying spot telecine apparatus.

A flying spot telecine apparatus is an apparatus in which consecutive frames of a cinema film are optically scanned in raster fashion by a light beam of cross-section (flying spot), the picture information thereby modulated on the light beam is converted by one or more opto-electronic detectors into electrical video signal form, and from the electrical video information there is derived by video processing circuits a television signal of which consecutive groups of television fields contain picture information derived from scanning respective consecutive film frames.

In flying spot telecines for the United States 525 line/60 field television system the cinema film is driven at 24 frames per second and the consecutive groups of fields contain three and two fields alternately, and in the European 625 line/50 field television system the film is driven at 25 frames per second and the consecutive groups of fields contain two fields each. In both television systems the television signal is interlaced which means that each complete television picture of 625 or 525 lines is composed of two consecutive fields (known as a television frame) of $312\frac{1}{2}$ and $262\frac{1}{2}$ lines each respectively, the lines of the two fields being interlaced upon reproduction on the television screen to produce 625 or 525 lines.

Existing commercially available flying spot telecines are one of two types—intermittent film motion and continuous film motion. The intermittent type at present can handle only a limited range of film sizes satisfactorily, and even so wear and tear is a problem. The continuous type generally uses either twin lens scanning, which cannot however be used on the United States 525/60 system where the field frequency is not twice the film frame rate, or the jump scan technique which suffers from the disadvantage of requiring very accurate registration of two field scans on the 625/50 system and five field scans on the 525/60 system. It is generally thought a flying spot telecine with continuous film motion would provide the simplest and best telecine if the problems of field to field registration could be overcome.

One method of overcoming this problem for the 625/50 system uses sequential scanning and forms the subject of our copending patent application Ser. No. 846,567, filed Oct. 28, 1977. The present invention provides a different solution, applicable to both 625/50 and 525/60 systems.

According to the present invention there is provided in a flying spot telecine apparatus comprising means for driving a cinema film past a scanning position at a predetermined rate of film frames per second, means for optically scanning consecutive frames of a cinema film in raster fashion by a light beam of small cross-section, opto-electronic detector means for converting the picture information thereby modulated on the light beam into electrical video signal form, and video processing circuit means for deriving from the electrical video information a television signal of which consecutive groups of television fields contain picture information derived from scanning respective consecutive film frames, the improvement wherein the film driving means is adapted to drive the film with continuous motion, wherein the scanning means is adapted to make at least one field scan of each film frame, and wherein the video processing circuit means comprises means for deriving the picture information for all television fields of each group from the said one field scan only of the respective film frame.

To improve vertical resolution a high frequency spot wobble may be added to the scanning raster, and the video processing circuits may comprise switching means for deriving the picture information of consecutive television fields alternately from the positive and negative half cycles of the spot wobble.

In an embodiment of the invention arranged for operation according to the 625/50 standard, the film is driven at 25 frames per second, each said one field scan is spaced by one field period from the next, and the video processing circuits comprise means for deriving respective portions of electrical video information from the said one field scans, each said information portion being one field period in duration and being separated from its neighbours by one field period, and means comprising a delay and switching arrangement for deriving from said information portions a television signal wherein consecutive television field groups, each containing two fields, are derived from consecutive information portions respectively, whereby the fields in each group contain picture information derived from one field scan only.

In this embodiment the delay and switching arrangement preferably comprises two parallel paths to each of which the information portions are applied, one of said paths having a delay of one field period relative to the other, the arrangement further comprising an output switch controlled to switch between respective outputs of the parallel paths at field frequency.

If a spot wobble is added to the raster, the information portions are applied to the parallel paths through a switching means which operates such that information derived from the negative half cycles of the spot wobble is applied to the one path and information derived from the positive half cycles of the spot wobble is applied to the other path.

In a second embodiment of the invention, arranged for operation according to the 525/60 standard, the film is driven at 24 frames per second, each said one field scan is spaced by one and a half field periods from the next, and the video processing circuits comprise means for deriving respective portions of electrical video information from the said one field scans, each said information portion being one field period in duration and being separated from its neighbours by one and a half field periods, and means comprising a delay and switching arrangement for deriving from said information portions a television signal wherein consecutive television field groups, of alternately two and three fields each, are derived from consecutive information portions respectively, whereby the fields in each group contain picture information derived from one field scan only.

In this second embodiment the delay and switching arrangement preferably comprises two parallel paths to each of which the information portions are applied, one of said paths containing a delay circuit to provide a delay relative to the other path of both one and two field periods, or both $\frac{1}{2}$ and 3/2 field periods, depending upon the setting of a two position switching means associated with the delay circuit, said switching means being controlled to switch from one position to the other at film frame frequency, the delay and switching arrangement also comprising an output switch controlled to switch between respective outputs of the said parallel paths in such manner that during the occurrence at the output of the said other path of video information derived from alternative information portions applied to the input of the said other path the output of the said other path is connected through the switch to the output thereof whereas at all other times the output of the said one path which contains the delay circuit is connected through the switch to the output thereof.

If a spot wobble is added to the raster, a switching means having two outputs is connected to the output switch, the switching means operating such that video information derived from positive and negative half cycles of the spot wobble is provided at respective ones of its two outputs, and a further switch is arranged to switch between the outputs of the switching means at field frequency, the switchovers occurring between television fields.

Figure 2:
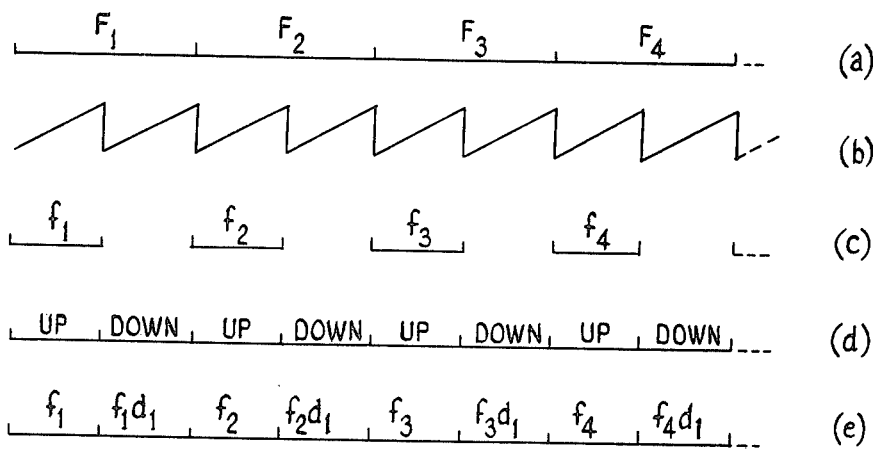
Figure 3:
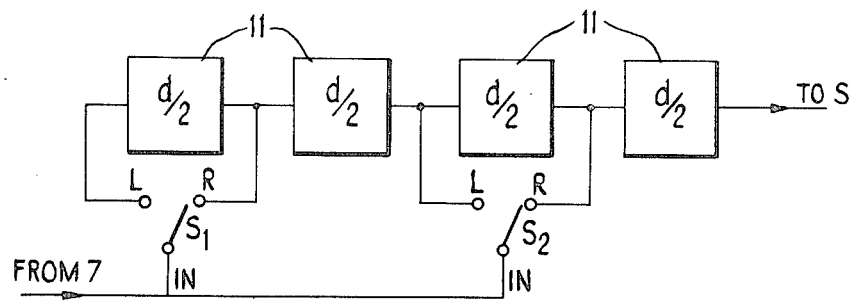
Figure 4:
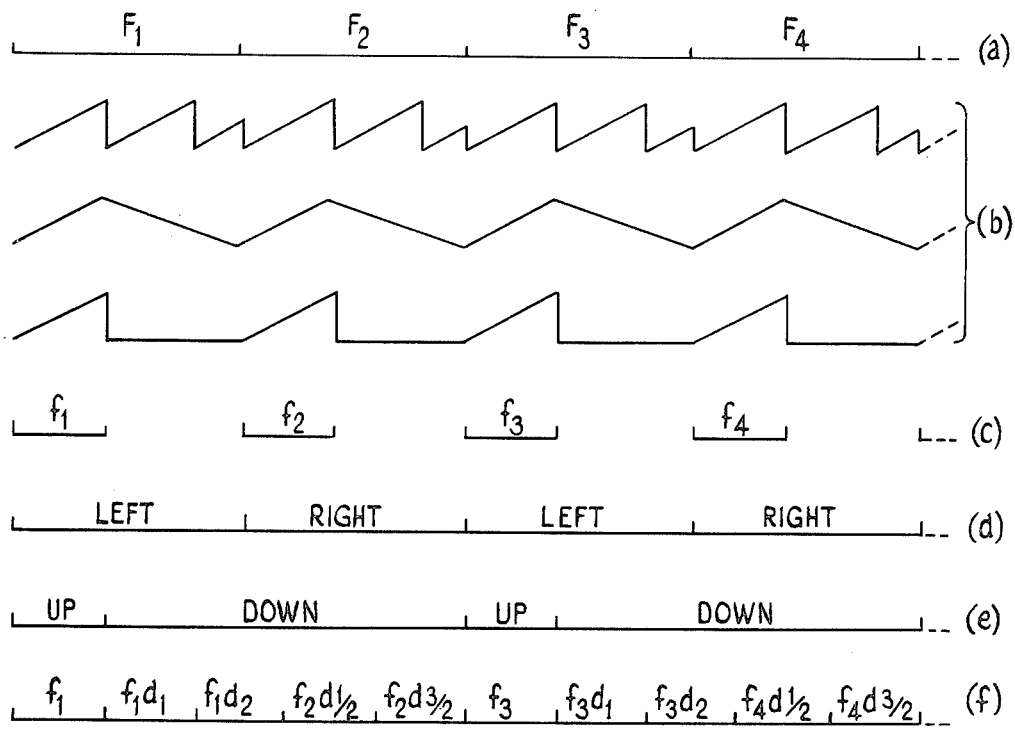
Figure 5:
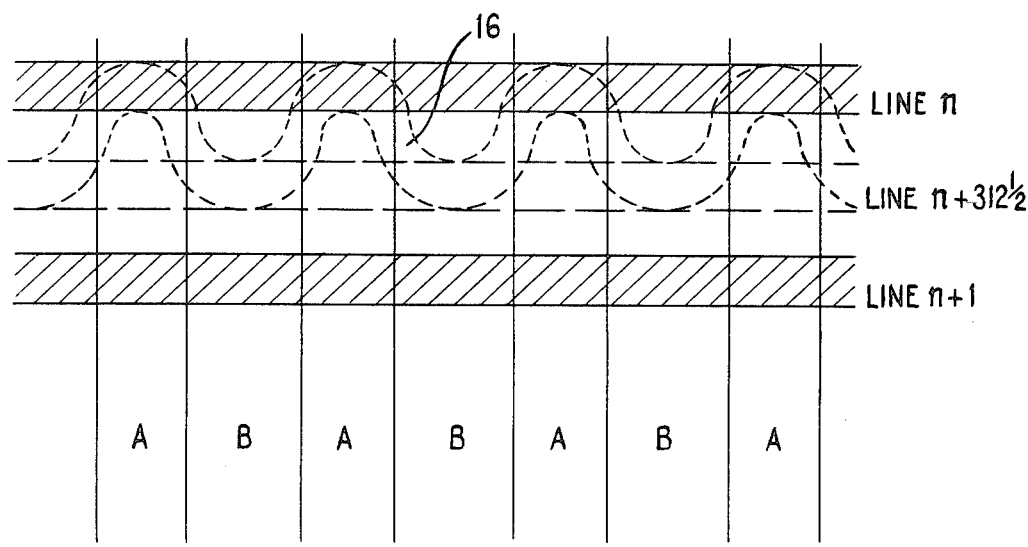
Figure 6:
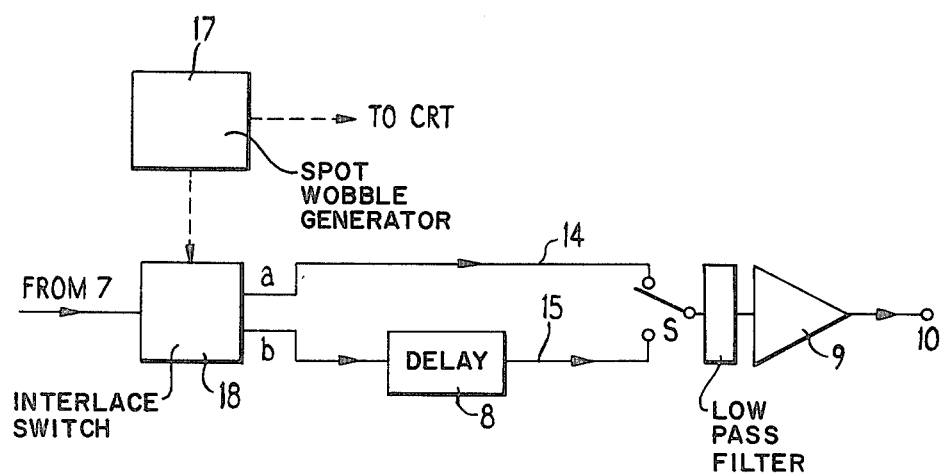
Figure 7:
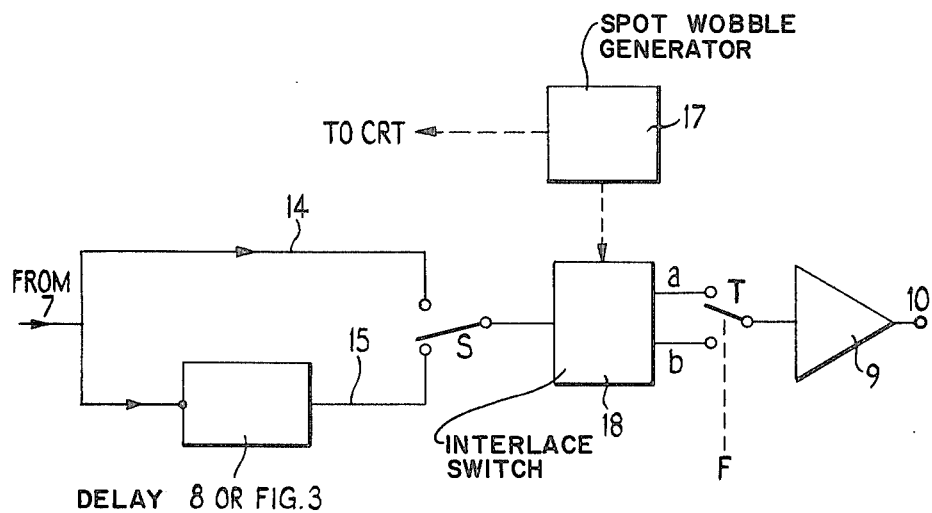

Embodiments of the invention will now be described, by way of example, with reference to the accompanying drawings, in which:

FIG. 1 is a schematic diagram of a first embodiment of a flying spot telecine apparatus according to the invention for operation according to the 625/50 television standard, FIG. 2 is a timing diagram to aid in undertaking the operation of the apparatus of FIG. 1, FIG. 3 illustrates how the apparatus of FIG. 1 can be modified to provide a second embodiment for operation according to the 525/60 standard, FIG. 4 is a timing diagram for the second embodiment, FIG. 5 illustrates a technique for deriving interlace information which can be applied to both the first and second embodiments, FIG. 6 shows how the first (625/50) embodiment can be modified to incorporate the technique of FIG. 5, and FIG. 7 shows how either the first or second (525/60) embodiment can be modified to incorporate the technique of FIG. 5.

Referring now to FIG. 1, the telecine apparatus there shown comprises a cathode ray tube 1 upon which is produced a flying spot raster in conventional manner by horizontal and vertical deflection generators 12 and 13 respectively. The raster is focussed on a film 2 by an optical system 3. The apparatus further comprises means (not shown) for driving the film 2 with continuous motion past a film gate in the direction indicated. The driving means for the film 2 may be a servomechanism of known construction and is arranged to drive the film at a constant speed past the gate.

Since the present embodiment of the invention is arranged for operation according to the 625/50 standard the film 2 is driven at a constant 25 film frames per second which is usual for this standard. Each film frame therefore replaces the preceding film frame in the film gate during a period of 40 ms to arrive at precisely the same position in the gate. This is shown in line (a) of FIG. 2 where $F_1$, $F_2$ etc. represent consecutive film frame periods and the divisions are at 40 ms intervals.

The horizontal scan of the flying spot raster is perfectly normal for telecines operating according to the 625/50 standard, both in respect of frequency (15625 HZ) and amplitude. The vertical scan is also of standard frequency, 50 HZ, but has a reduced amplitude since the motion of the film contributes to the vertical scanning. Thus the vertical scan has approximately half the amplitude which would be required to produce a normal 4:3 aspect ratio in the case of intermittent film motion where each film frame is scanned while temporarily motionless. The vertical scanning waveform is shown in line (b) of FIG. 2.

Each scan of the film therefore produces picture information modulated on the flying spot light beam sufficient for a single television field of $312\frac{1}{2}$ lines, and is, therefore, referred to herein as a field scan. This is in contrast to a sequential scan wherein each scan produces picture information sufficient for a complete television picture or frame of 625 lines.

Although two field scans are made during the passage of each film frame through the gate, only the information derived from one (in this embodiment, the first) of these is used in the subsequent derivation of a television signals. Clearly the relationship between the beginning of each first field scan of consecutive pairs of scans and the position of the film at that same moment must be such that during the subsequent field period said first scan scans only a respective one film frame. This means that the second field scan of the pair will scan a part of the respective film frame and a part of the immediately following film frame, but since the information derived from this second scan is not used this is immaterial.

If desired the cathode ray tube can be blanked during the period of the second field scan, or blanking can be effected at a convenient point in the video processing circuits. However, such blanking is not strictly necessary in this embodiment since the switching arrangement to be described later will automatically remove the information produced by the second field scan of each pair. In the following, therefore, only the picture information derived from the first field scan of each pair will be considered.

The modulated flying spot is focussed by a second optical system 4 onto a light-splitter and photocell arrangement 5 which produces in conventional manner red, green and blue video (colour value) signals R, G and B respectively. These video signals are processed in known manner by the video channel 6 and thereafter coded in the colour encoder 7 to form a single colour encoded signal at the output therof. The colour encoded signal at this stage is shown in line (c) of FIG. 2 where $f_1$, $f_2$ etc. represent those portions of the coded signal derived from the first field scans of frame periods $F_1$, $F_2$ etc. respectively. It is to be understood in FIG. 2 that the vertical alignment of $f_1$, $f_2$ etc. with the respective first field scans of line (b) assumes for simplicity that there is no delay in the components 5, 6 and 7.

The coded signal from 7 is passed via two parallel paths 14 and 15 to respective inputs contacts of an output switch S for the paths. The upper path 14 connects the signal directly to an upper input contact U, whereas the lower path 15 connects the signal to a lower input contact D through a delay device 8 having a delay period d equal to one television field period (20 ms). Thus the coded signal is delayed by one field period at the lower input contact relative to the upper contact. A switchable output contact 0 is switched between the upper and lower input contacts in the manner represented in line (d) of FIG. 2. Line (d) shows that the switchable output contact is connected to the upper input contact during direct receipt thereat of the colour coded portions $f_1$, $f_2$ etc., whereas it is connected to the lower input contact during the intervening one field periods to pass the delayed signal to the output.

The result is as shown in line (e) of FIG. 2, which represents the television signal at the output of the switch S. In line (e), $f_1d_1$ represents signal $f_1$ delayed by one field period d, $f_2d_1$ represent signal $f_2$ delayed by one field period d, and so on. It will be seen that the television signal comprises consecutive television field groups (of two fields each) derived from scanning respective consecutive film frames, with the fields in each group containing picture information derived from only one field scan of the respective film frame, this having been achieved by delaying and repeating the information derived from said one field scan.

From the output of the switch S the television signal represented by line (e) of FIG. 2 is passed to an amplifier 9 at whose output 10 the amplified signal is available for further use.

The output switch S referred to above will in practice by an electronic switch, for example a semiconductor switch. It is clear from line (d) of FIG. 2 that this switch must be switched between the respective outputs of the two parallel paths at field frequency to obtain the desired output at the amplifier, and such switching can conveniently be controlled by field frequency pulses derived from the television station sync generator (not shown) which synchronises the horizontal and vertical deflection generators of the cathode ray tube 1 in conventional manner.

The delay device 8 may be of either analogue or digital type. The latter is more suitable, however, in that it produces least impairment of the picture quality. Delay devices of both types which may be used in the present apparatus are well known in the art.

The system described above inherently degrades vertical resolution and also produces slight distortion on diagonal lines. This is because consecutive fields are reproduced interlaced on the television screen and, since these fields contain precisely the same information, pairs of adjacent lines on the screen will be identical. These effects are considerably improved by the use of a vertical aperture corrector for resolution and a line interpolator for correcting diagonal edges. The use of vertical aperture correctors is commonplace in television equipment and line interpolation is well known in Standards Convertor technology.

An embodiment of the invention for operation according to the 525/60 standard will now be described. The schematic diagram of FIG. 1 may also be used for this second embodiment, with the exception that the delay circuit of FIG. 3 be substituted for the delay device 8 of FIG. 1.

In this second embodiment the film 2 is arranged to be driven in known manner with continuous motion at a constant speed of 24 film frames per second past the film gate. This is conventional for the 525/60 standard. Each film frame, therefore, replaces the preceding film frame in the film gate during a period of 41.66 ms to arrive at precisely the same position in the gate. This is represented in line (a) of FIG. 4 where $F_1$, $F_2$ etc. represent consecutive film frame periods and the divisions are at 41.66 ms intervals.

The horizontal scan of the flying spot raster is conventional for the 525/60 standard both in respect of frequency (15750 HZ) and amplitude. The vertical scan waveform used cannot, however, be conventional at 60 HZ since the film frame period (41.66 ms) is not an integral multiple of the field period (16.66 ms) in the 525/60 standard, but is in fact equal to 2.5 times the field period. If a conventional 60 Hz vertical scan were used movement of the raster as a whole relative to the film would be required thus introducing problems of registration which the invention seeks to avoid. The solution is to use one of the two vertical waveforms indicated in the upper and middle lines (b) of FIG. 4.

The first waveform of line (b) represents a conventional 60 HZ scan triggered to perform a sequence of two normal scans followed by a half scan, and the second waveform represents a 24 HZ sawtooth with a 40% active stroke and a 60% flyback. In both cases the relationship between the vertical scan waveform and the film motion is such that the initial rising portion of the waveform (occupying 16.66 ms which is a field period in the 525/60 standard) in each film frame period $F_1$, $F_2$ etc. causes a single field scan of the respective film frame. It is to be noted once again that a field scan is one that produces picture information modulated on the flying spot sufficient for a single television field in the standard concerned, in this case a field of $262\frac{1}{2}$ lines. Once again, as in the previous embodiment, the vertical scan must be of reduced amplitude to allow for movement of the film. In this embodiment, however, the reduction in amplitude is less since the film motion contributes only about 40% of the scanning height as opposed to about 50% in 625 line operation.

In this embodiment, the information derived from the remainder of the vertical waveform apart from the initial rising portion must be blanked since, unlike the first embodiment, it is not automatically removed in the switching. This can be done at any convenient point in the video processing prior to the delay and switching arrangement of FIG. 3, or the cathode ray tube can be blanked. This last case is shown in the lower line (b) of FIG. 4 for the upper waveform.

In a similar manner to the first embodiment, the modulated flying spot is focused by the optical system 4 onto the light splitter and photocell arrangement 5, and the red, green and blue video signals are passed through the video channel 6 and colour coder 7 to form a single colour encoded signal at the output of the latter. The resultant colour encoded signal is shown in line (c) of FIG. 4, wherein $f_1$, $f_2$ etc. represent the portions of the signal derived from the single field scans of the respective frame periods $F_1$, $F_2$ etc., the intervening information having been previously blanked if the cathode ray tube was not originally blanked during these intervening periods.

The coded signal from 7 is, as before, passed via two parallel paths to respective input contacts of an output switch S. Once again the signal is connected through the upper path directly to the upper input contact, but is connected to the lower input contact through the delay circuit of FIG. 3 in the lower path.

The delay circuit of FIG. 3 comprises four delay devices 11 connected in series and each having a delay d/2 of one half of a field period (8.33 ms), and a two-position switching means comprising two switches $S_1$ and $S_2$ each having a left output contact L, a right output contact R, and a switchable input contact. The contacts L, R and the input contact of each switch are connected as shown. The colour coded signal from encoder 7 enters the arrangement from the left and leaves for the switch S to the right.

The switching sequence is shown in lines (d) and (e) of FIG. 4. Line (d) represents the switching sequence of both switches $S_1$ and $S_2$, these being arranged to switch in synchronism as indicated by the dashed line. It will be seen that the switchable input contact of each switch $S_1$ and $S_2$ is held in contact with its left output contact L from the beginning of alternate encoded signal portions $f_1$, $f_3$ etc. to the beginning of the intervening signal portions $f_2$, $f_4$ etc. and held in contact with its right output contact R from the beginning of the intervening signal portions $f_2$, $f_4$ etc. to the beginning of the first mentioned alternate portions $f_1$, $f_3$ etc. The switches $S_1$ and $S_2$ thus switch at film frame frequency from one position to the other. The switching sequence for the output switch S is represented in line (e), which shows that the switchable output contact of switch S is connected to its upper input contact only during the occurrence of those alternate signal portions $f_1$, $f_3$ etc. for which the switches $S_1$ and $S_2$ are left, and at all other times is connected to its lower input contact.

The result of this switching sequence is the television signal shown in line (f) of FIG. 4, where $f_1d_1$ represents signal $f_1$ delayed by one field period d, $f_1d_2$ represents signal $f_1$ delayed by two field periods d, $f_2d_{\frac{1}{2}}$ represents signal $f_2$ delayed by one half of a field period d, $f_2d_{3/2}$ represents signal $f_2$ delayed by 3/2 times the field period d, and so on. It will be seen that the television signal comprises consecutive television field groups (of alternately two and three television fields) derived from scanning respective consecutive film frames, with the fields in each group containing picture information derived from only one field scan of the respective film frame.

As before, the switches S, $S_1$ and $S_2$ are preferably semiconductor switches, and since the switching sequences are related to the field frequency in a predetermined manner control signals for these switches may be derived by a simple logic circuit from field frequency pulses supplied by the station sync generator. Furthermore, the delay devices 11 may be analogue or digital, and this 525/60 embodiment will preferably embody the invention claimed in our copending application Ser. No. 865,782, filed Dec. 30, 1977.

Line interpolation and aperture correction techniques may again be used to improve the inherent disadvantages mentioned previously in relation to the first embodiment. However, in both embodiments the use of line interpolation and vertical aperture correction provides only a partial but not a total remedy. The following describes a technique for obtaining the correct information for the interlaced field which may be applied to both this and the preceding embodiment. The technique is to add to the scanning a high frequency vertical component or spot wobble. This spot wobble has a frequency which is high compared with the video information, e.g. greater than 10 MHz. The amplitude of the spot wobble is substantially equal to the spacing between two adjacent lines of a complete television frame, i.e. the distance between one line and the nearest interlaced line.

Synchronised with the spot wobble generator is a switch in the video processing circuits. This switch generates two outputs one of which corresponds with the positive half cycle of spot wobble and the other with the negative half cycle. Consequently one output gives the correct information for one television field and the other gives the correct information for the interlaced field. A low pass filter (6 MHZ) may be used to remove the gaps in the outputs of the interlace, non-interlace switch.

FIG. 5 illustrates the basic idea for the 625/50 standard. In FIG. 5, shaded lines n and (n+1) represent adjacent scanned lines in the single field scan of each film frame. The lines n and (n+1) may also be taken to represent the positions of the same lines when reproduced on a television screen during the first field of a frame. During the second field of the frame the lines n and (n+1) are repeated and reproduced interlaced with their positions in the first field; that is, they are displaced by one half the vertical distance between adjacent lines of the field scan. Thus line n will be reproduced at the position indicated by line $(n+312\frac{1}{2})$. The duplication of information in lines n and $(n+312\frac{1}{2})$ accounts for the reduction in vertical resolution.

However, by superimposing a high frequency spot wobble such as that schematically shown at 16 for the line n only—although it is to be understood that the spot wobble is added throughout the scanning—the correct information for the interlaced lines such as $(n+312\frac{1}{2})$ can be derived, still from only a single field scan of the film per frame. The amplitude of the spot wobble 16 is less than the line spacing in the single field scan, and preferably substantially equal to half the line spacing in the single field scan, as shown. The picture information for the interlaced lines such as $(n+312\frac{1}{2})$ can be derived from the negative half cycles (occurring during periods B in FIG. 5) of the spot wobble, whereas the non-interlaced information for lines such as n can be derived from the positive half cycles (periods A).

FIG. 6 is a schematic block diagram showing how this technique may be applied in practice to modify the 625/50 embodiment of FIGS. 1 and 2. The spot wobble (at, for example, 10 MHZ) is produced by a signal generator 17 which also controls an interlace/non-interlace switch 18 inserted between the encoder 7 and the paths 14 and 15. The switch 18 takes the coded signal from 7 as input and has two outputs a and b of which output a feeds path 14 and output b feeds path 15. Apart from these additions, the apparatus is as shown in and described with reference to FIGS. 1 and 2.

The switch 18 operates (under the control of the spot wobble generator 17) to switch the coded input signal from 7 between the outputs a and b at double the spot wobble frequency in such manner that the portions of the coded signal derived from the positive half cycles A of the spot wobble are fed to the path 14 and the portions of the coded signal derived from the negative half cycles B are fed to the path 15. Thus non-interlace information is fed via switch S directly to the amplifier 9 for producing television fields $f_1$, $f_2$ ... etc. (FIG. 2e) and interlace information is fed via the one field period delay 8 to the amplifier for producing television fields $f_1d_1$, $f_2d_2$ ... etc. The result is that the second field of each group of two television fields correctly contains interlace information and the first field contains non-interlace information, the two fields of information nevertheless having been produced from a single field scan.

The outputs a and b from switch 18 are preferably taken through a low pass filter (having an upper limit of, for example, 6 MHZ) to remove the gaps produced by the switch 18. To this end a respective filter (not shown) may be associated with each output a and b, or a single filter may be placed after the switch S in association with the amplifier 9.

The spot wobble technique can also be applied to the 525/60 embodiment of FIGS. 3 and 4. In this case, due to the fact that consecutive television field groups derived from consecutive film frames consist of alternately two and three fields, an arrangement equivalent to FIG. 6 is not suitable since the latter can only be used where each field group contains two fields only. The arrangement shown in FIG. 7 may be used, however, both as a modification of the 625/50 embodiment or the 525/60 embodiment. Either the delay circuit of FIG. 3 or the delay device 8 of FIG. 1 will be present in FIG. 7 depending upon whether the latter is a modification of the 525/60 or 625/50 embodiment respectively.

In FIG. 7 the interlace/non-interlace switch 18 has been moved to the output of the switch S. Thus the switch 18 receives as input the television signal of FIG. 2(e) or FIG. 4(f) depending upon the system under consideration. The switch 18 is controlled in the same way as before by the generator 17, and the outputs a and b of the switch are connected to respective outputs of a further (preferably electronic) switch T. The output of the switch T is connected to the amplifier 9 and is switched at field frequency between the inputs a and b under the control of a field frequency signal F derived, for example, from the generator 13 (FIG. 1). The switchovers occur between the fields of the television signal of FIG. 2(e) or FIG. 4(f), whereby consecutive fields contain non-interlace and interlace information alternately irrespective of their location in the television field groups derived from the respective film frames nor the size of these groups (two fields each in the 625/50 system and alternately two and three fields in the 525/60 system). Once again, a low pass filter may be used to smooth the final signal.

I claim:

1. In a flying spot telecine apparatus comprising means for driving a cinema film past a scanning position at a predetermined rate of film frames per second, means for optically scanning consecutive frames of a cinema film in raster fashion by a light beam of small cross-section, opto-electronic detector means for converting the picture information thereby modulated on the light beam into electrical video signal form, and video processing circuit means for deriving from the electrical video information a television signal of which consecutive groups of television fields contain picture information derived from scanning respective consecutive film frames, the improvement wherein the film driving means is adapted to drive the film with continuous motion, wherin the scanning means is adapted to make at least one field scan of each film frame, and wherein the video processing circuit means comprises means for deriving the picture information for all the television fields of each group from the said one field scan only of the respective film frame.

2. A flying spot telecine apparatus according to claim 1 and arranged for operation according to the 625/50 television standard, wherein the film driving means is adapted to drive the film at 25 frames per second, wherein each said one field scan is spaced by one field period from the next, and wherein the video processing circuit means comprises means for deriving respective portions of electrical video information from the said one field scans, each said information portion being one field period in duration and being separated from its neighbour by one field period, and means comprising a delay and switching arrangement for deriving from said information portions a television signal wherein consecutive television field groups, each containing two fields, are derived from consecutive information portions respectively, whereby the fields in each group contain picture information derived from one field scan only.

3. A flying spot telecine apparatus according to claim 2, wherein the delay and switching arrangement comprises two parallel paths to each of which the information portions are applied, one of said paths having a delay of one field period relative to the other, the arrangement further comprising an output switch controlled to switch between respective outputs of the parallel paths at field frequency.

4. A flying spot telecine apparatus according to claim 1 and arranged for operation according to the 525/60 television standard, wherein the film drive means is adapted to drive the film at 24 frames per second, wherein each said one field scan is spaced by one and a half field periods from the next, and wherein the video processing circuits comprise means for deriving respective portions of electrical video information from the said one field scans, each said information portion being one field period in duration and being separated from its neighbour by one and a half field periods, and means comprising a delay and switching arrangement for deriving from said information portions a television signal wherein consecutive television field groups, of alternately two and three fields each, are derived from consecutive information portions respectively, whereby the fields in each group contain picture information derived from one field scan only.

5. A flying spot telecine apparatus according to claim 4, wherein the delay and switching arrangement comprises two parallel paths to each of which the information portions are applied, one of said paths containing a delay circuit to provide a delay relative to the other path of both one and two field periods, or both ½ and 3/2 field periods, depending upon the setting of a two position switching means associated with the delay circuit, said switching means being controlled to switch from one position to the other at film frame frequency, the delay and switching arrangement also comprising an output switch controlled to switch between respective outputs of the said parallel paths in such manner that during the occurrence at the output of the said other path of video information derived from alternate information portions applied to the input of the said other path the output of the said other path is connected through the switch to the output thereof whereas at all other times the output of the said one path which contains the delay circuit is connected through the switch to the output thereof.

6. A flying spot telecine apparatus according to claim 1, further including means to add a high frequency spot wobble to the scanning raster, the video processing circuits further comprising switching means for deriving the picture information of consecutive television fields alternately from the positive and negative half cycles of the spot wobble.

7. A flying spot telecine apparatus according to claim 3, further including means to add a high frequency spot wobble to the scanning raster, and a switching means through which the information portions are applied to the said parallel paths, the switching means being adapted to operate such that information derived from the negative half cycles of the spot wobble is applied to a first of the parallel paths and information derived from the positive half cycles of the spot wobble is applied to the second of the paths.

8. A flying spot telecine according to claim 3, further including means to add a high frequency spot wobble to the scanning raster, a switching means having two outputs connected to the output switch, the switching means being adapted to operate such that video information derived from positive and negative half cycles of the spot wobble is provided at respective ones of its two outputs, and a further switch arranged to switch between the outputs of the switching means at field frequency, the switchovers occurring between television fields.

9. A flying spot telecine apparatus according to claim 5, further including means to add a high frequency spot wobble to the scanning raster, a switching means having two outputs connected to the output switch, the switching means being adapted to operate such that video information derived from positive and negative half cycles of the spot wobble is provided at respective ones of its two outputs, and a further switch arranged to switch between the outputs of the switching means at field frequency, the switchovers occurring between television fields.

10. A flying spot telecine apparatus according to claim 6, wherein the video processing circuits further comprise low pass filter means for smoothing the signals from the switching means.

* * * * *